United States Patent

[11] 3,603,723

[72] Inventor Sing Liong Tan
Emmasingel, Eindhoven, Netherlands

[21] Appl. No. 733,108
[22] Filed May 29, 1968
[45] Patented Sept. 7, 1971
[73] Assignee U.S. Philips Corporation
New York, N.Y.
[32] Priority June 19, 1967
[33] France
[31] 110938

[54] COLOR TELEVISION CAMERA
6 Claims, 7 Drawing Figs.

[52] U.S. Cl. .......... 178/5.4 R, 178/7.2
[51] Int. Cl. .......... H04n 9/08, H04n 3/22
[50] Field of Search .......... 313/65, 66; 178/5.4 ES, 5.4 ST, 7.2 A

[56] References Cited

UNITED STATES PATENTS 3,510,575 5/1970 Dillenburger et al. .......... 178/5.4 ST
3,333,053 7/1967 Back .......... 178/5.4
3,453,471 7/1969 Sheldon .......... 313/65
3,461,223 8/1969 Wilcox .......... 178/5.2

*Primary Examiner*—Robert L. Griffin
*Assistant Examiner*—John C. Martin
*Attorney*—Frank R. Trifari

ABSTRACT: A color television camera employing at least two camera tubes one of which provides a luminance signal, and the other of which provides chrominance signals. A light-beam splitter directs a portion of the light from the image to the photosensitive layer of the luminance camera tube in which a potential image corresponding to the visible image is formed and another portion to the chrominance camera tube for producing chrominance signals. Between the light-beam splitter and chrominance camera tube, a member capable of concentrating the light on a given number of areas evenly distributed throughout the surface of the photosensitive layer is provided. Scanning of the photosensitive layer by an electron beam thus supplies a chrominance signal which transmits the moving parts of the scene substantially without inertia.

INVENTOR.
SING LIONG TAN
BY
AGENT

INVENTOR.
SING LIONG TAN
BY
Frank R. Trifari
AGENT

INVENTOR.
SING LIONG TAN
BY
Frank R. Trifari
AGENT

COLOR TELEVISION CAMERA

The invention relates to a color television camera comprising at least two camera tubes each having a photosensitive layer and optical means for producing a scene to be transmitted on said photosensitive layers so that potential images corresponding to the optical image of the scene are formed, each potential image being converted into an electric signal by means of an electron beam scanning the photosensitive layer.

In such a camera the camera tubes operate in principle as follows: an electron beam scans a thin layer of photosensitive material, on which the scene to be transmitted is projected. This layer forms so to say a mosaic of a great number of capacitors, termed image elements, with a transparent, conductive layer, termed the signal plate, applied to the photosensitive layer and connected to the positive terminal of a battery. Each capacitor thus carries a leakage current the intensity of which depends upon the local intensity of the exposure. The electron beam may be considered to form a multiple switch which connects in order of succession the image elements to the, for example, earth-connected negative terminal of said battery. When the electron beam passes over an image element the higher potential of the free surface of the element concerned facing the beam produced by the leakage current drops abruptly to earth potential. The current pulse thus produced in the output circuit is a measure of the local brightness. For the remaining duration of a field period of time after which the beam again strikes the same image element, the capacitor forming the element is discharged by the leakage current due to the local exposure in dependence upon which the potential of the free surface again increases.

When the intensity of the light beam striking the photosensitive layer of a camera tube changes abruptly, this change does not become directly manifest in a variation of the signal current. An amount of inertia is involved, mainly because within the short period of time of striking a given image element the electron beam can supply only a finite charge due to its restricted current strength and its own resistance. This phenomenon is termed discharge inertia.

In a color television camera the discharge inertia is admissible to some extent in the luminance tube, but it has to be minimized in the chrominance tubes, since in the signal reproduction the inertia produces a change of colors.

Since the discharge inertia is the smaller the lower is the capacitance of the photosensitive layer, it is advantageous to reduce the surface of the layer for reducing said capacitance.

The solution adopted in known devices for reducing the discharge inertia in the chrominance tubes consists in such a reduction of the dimensions of the photosensitive layers that the capacitance is sufficiently low. An optical system formed by a set of lenses adapts the image to be analyzed to the dimensions of the photosensitive layer. The surface of the sensitive layer of the luminance tube is, however, maintained sufficiently large to obtain a satisfactory definition.

These known devices have various disadvantages: the optical lens system is complicated and exhibits poor efficiency; the luminance image and the chrominance images are no longer geometrically identical so that nonidentical scanning rasters may result; moreover, the superimposition of the images in the reproduction involves difficulties.

The invention has for its object to provide a color television camera in which said disadvantages are obviated and in which the discharge inertia of the identical camera tubes can be considerably reduced.

The color television camera according to the invention is characterized in that in order to obtain a luminance signal corresponding to an optical image of high definition the analysis is carried out in a first tube by means of a continuous optical image formed substantially throughout the surface of the photosensitive layer and in that for a substantially inertialess transmission of the moving parts of the scene in the chrominance signal, the chrominance signal is obtained by the analyses of a discontinuous optical image formed on the photosensitive layer of the other tube, the surface of said layer being equal to that of said first tube, while an additional optical member is arranged between said optical means and photosensitive layer of said other tube for concentrating the light of the scene on given areas evenly distributed throughout the surface of the photosensitive layer of said other tube.

The invention will be described by way of example with reference to the accompanying drawing.

Figure 1:
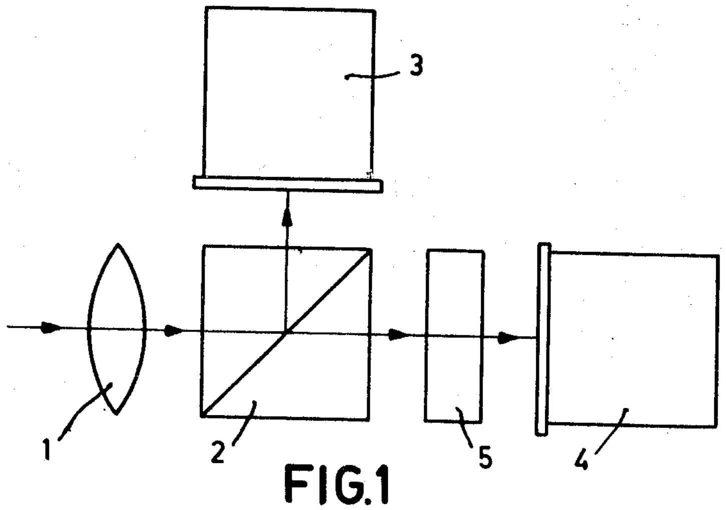
FIG. 1 shows schematically one embodiment of a color television camera according to the invention.

FIG. 1 shows schematically a television camera according to the invention comprising two tubes. The objective 1 receives the light rays from a scene to be transmitted. Optical means 2 direct the light rays to two camera tubes, one of which 3 produces a luminance signal and the other 4 produces one or more chrominance signals. The surfaces of the photosensitive layers of the camera tubes 3 and 4 are identical. The tubes may be of the Vidicon type and may be constructed as a "-Plumbicon." For producing the chrominance signals it is preferred to use a "Plumbicon" tube, since owing to the P.I.N. structure of the photosensitive layer the discharge inertia of such a tube is low in itself. The characters I, P and N designate intrinsic semiconductor material, acceptor-doped and donor-doped semiconductors, photosensitive material respectively.

A color television camera equipped with two camera tubes may be employed in a color television system with two fundamentals colors (Lans systems) and in a system having three fundamental colors (NTSC, Secam or Pal system). In the latter case an embodiment of the camera tube 4 as described in French Pat. Specification No. 1231,255 may be employed. The camera tube 4 supplies three chrominance signals and one index signal, obtained by means of a strip shaped color filter.

The tube 3 receives directly on its photosensitive layer the continuous optical image, which is projected by means of the optical means 2. The analysis of the resultant potential image by the electron beam of the tube 3 supplies a luminance signal corresponding to an image of high definition.

Figure 2:
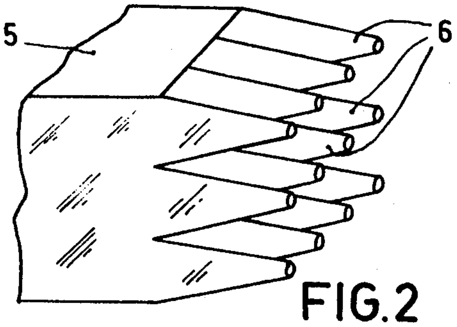
FIG. 2 shows in detail the shape of one of the principal members of said camera.

According to the invention an optical member 5 is arranged between the optical means 2 and the camera tube 4 for producing a chrominance signal which member is capable of concentrating the light on a given number of areas evenly distributed throughout the surface of the photosensitive layer. The member 5 (FIG. 2) may be formed by a transparent plate of glass or of a transparent synthetic resin having an adequate refractive index whose front face capturing the light rays is flat and whose rear face is provided with optical fibers 6. These fibers form truncated cones or pyramids, but they may have a more complicated profile in order to raise the light output.

Figure 3:
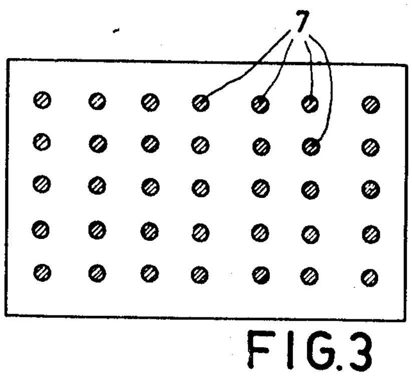
FIG. 3 shows schematically the image obtained by means of the member of FIG. 2.

Thus light zones 7 are obtained on the light-sensitive layer of the camera tube 4 (FIG. 3), which zones are evenly distributed throughout the surface of the photosensitive layer of the tube 4. Scanning of this layer by the electron beam supplies a chrominance signal which transmits the moving parts of the scene substantially without inertia. The discharge inertia of the tube 4 is thus reduced by the artificial reduction of the effective capacitance of the photosensitive layer, although the dimensions of the photosensitive layer of the tube 4 are the same as those of the tube 3.

Figure 4:
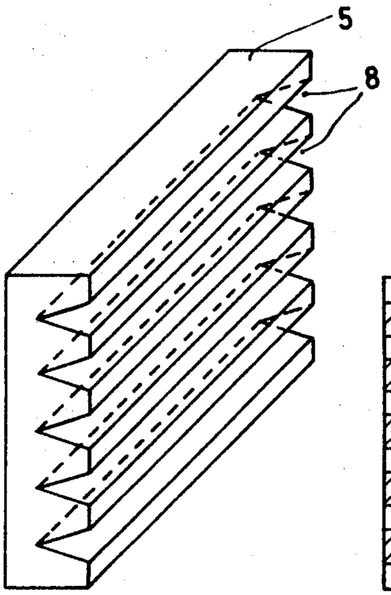
FIG. 4 shows a different shape of the member of FIG. 2.
Figure 5:
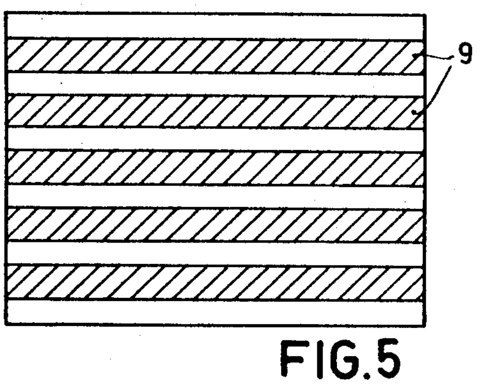
FIG. 5 shows schematically the image obtained by means of the member of FIG. 4.

FIG. 4 shows a variant of the optical member 5 for the concentration of the light on given areas of the photosensitive layer of the chrominance tube 4. The member 5 is formed by an optical network formed by a transparent plate whose surface facing the camera tube has a given number of grooves 8. The light zones of the photosensitive layer have the shape of strips 9 (FIG. 5).

The invention may also be applied to a color television camera system having more than two tubes, one serving for producing the luminance signal and the other tubes serving each for producing a chrominance signal.

Figure 6:
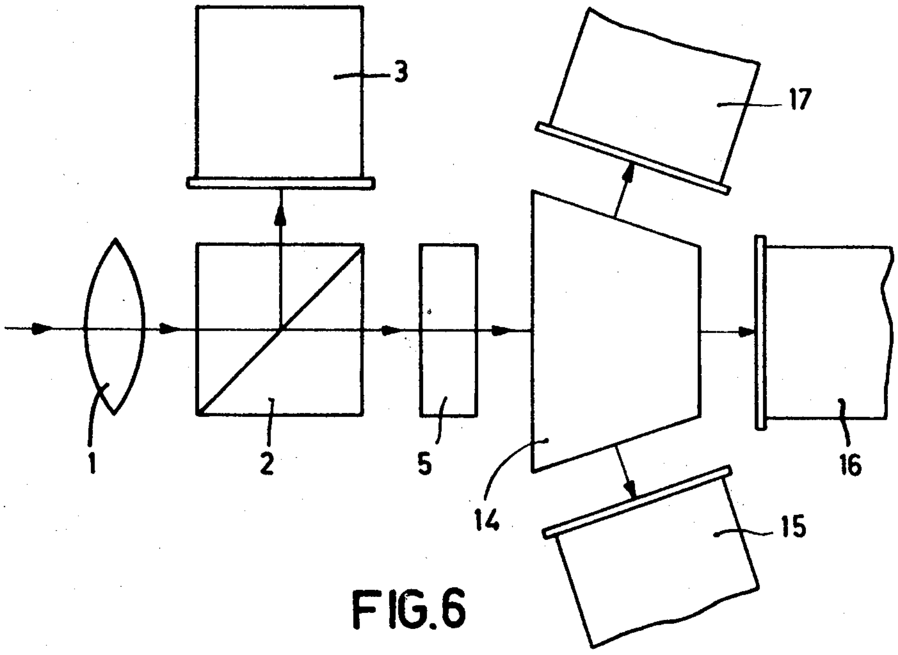
FIGS. 6 and 7 show schematically a different embodiment of a color television camera according to the invention.
Figure 7:
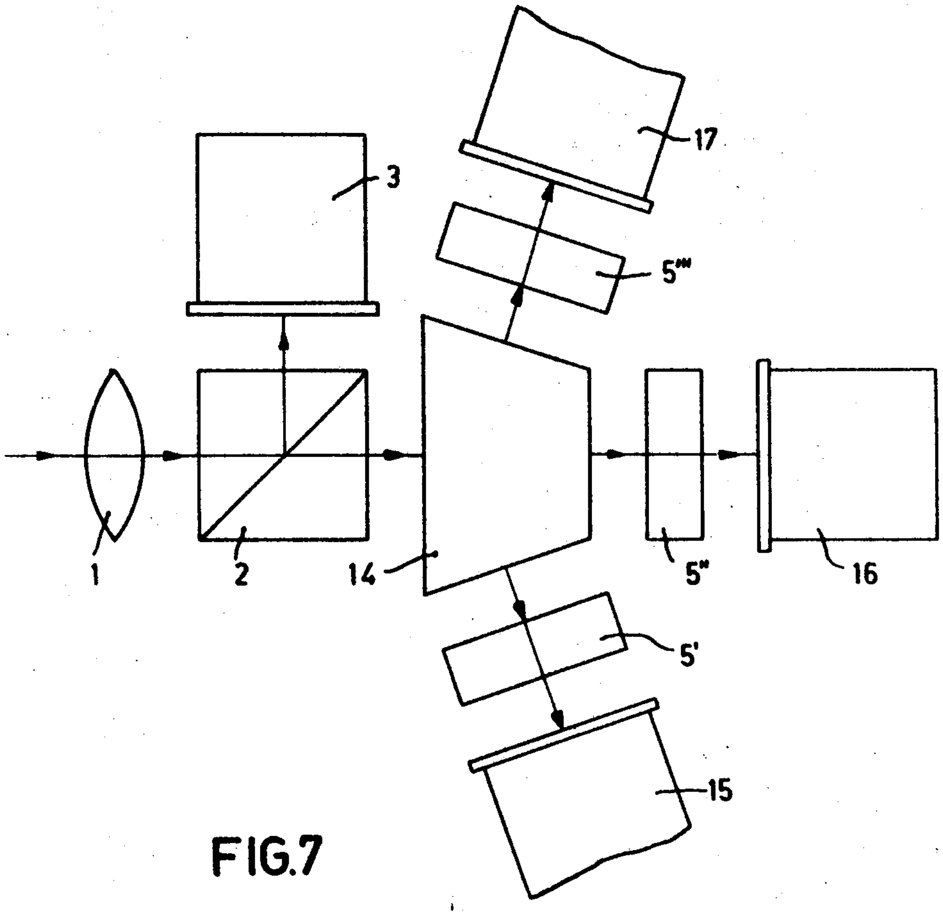

FIGS. 6 and 7 show schematically two embodiments of such a system in which the device according to the invention is employed. The parts corresponding with those in FIG. 1 are designated by the same reference numerals.

As is shown in FIG. 6 the optical member 5 concentrates the light on a given number of areas so that a discontinuous image is formed an optical element 14 constructed as a color splitter, so that an image in one of the three fundamental colors is produced on the photosensitive layer of each of the chrominance signal tubes 15, 16 and 17.

FIG. 7 shows schematically a variant of the device in which optical members 5', 5'' or 5''' concentrating the light on a given number of areas are arranged between the optical element 14, forming a color splitter, and the photosensitive layer of the respective chrominance signal tubes 15, 16 and 17.

What is claimed is:

1. A color television camera comprising at least two camera tubes each having a photosensitive layer, optical means for producing an image of a scene to be transmitted on each of said photosensitive layers so that potential images corresponding to the optical image of the scene are formed, means to scan the potential image in the respective photosensitive layers with an electron beam to convert the potential image to an electrical signal, said optical means including means for producing on the photosensitive layers of a first tube for producing a luminance signal a continuous optical image formed substantially throughout the surface of the photosensitive layer, the surface of said layer of said second tube being equal to that of said first tube, and an additional optical member positioned between said optical means and the photosensitive layer of said second tube, said optical member having portions for concentrating the light of the scene on given discrete areas evenly distributed throughout the surface of the photosensitive layer of said second tube whereby a discontinuous optical image is formed on said latter layer from which, by analysis thereof, a chrominance signal for substantially inertialess transmission is obtained

2. A color television camera is claimed in claim 1, wherein the camera comprises two additional tubes each of which produces only one chrominance signal and a color splitter through which the optical image is obtained for each of the chrominance signal tubes.

3. A color television camera as claimed in claim 1 wherein the additional optical member is formed by a plurality of optical fibers having a sectional area diminishing in the direction of the light transmission.

4. A color television camera as claimed in claim 1 wherein the additional optical member is a transparent plate having a plurality of grooves therein.

5. A color television camera as claimed in claim 2, wherein said single additional optical member is provided in front of the color splitter.

6. A color television camera as claimed in claim 2, wherein said additional optical member is arranged between the color splitter and each chrominance signal tube.